(12) United States Patent
Notheis

(10) Patent No.: US 10,760,620 B2
(45) Date of Patent: Sep. 1, 2020

(54) TRANSMISSION AND VEHICLE

(71) Applicant: ZF Friedrichshafen AG

(72) Inventor: Philipp Notheis, Salem-Mimmenhausen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 589 days.

(21) Appl. No.: 15/637,013

(22) Filed: Jun. 29, 2017

(65) Prior Publication Data

US 2018/0023634 A1    Jan. 25, 2018

(30) Foreign Application Priority Data

Jul. 19, 2016  (DE) .................. 10 2016 213 204

(51) Int. Cl.
| | |
|---|---|
| *F16D 21/04* | (2006.01) |
| *F16H 3/00* | (2006.01) |
| *F16H 3/28* | (2006.01) |
| *F16H 3/089* | (2006.01) |
| *F16H 3/08* | (2006.01) |
| *F16D 23/04* | (2006.01) |
| *F16H 37/08* | (2006.01) |

(52) U.S. Cl.
CPC ............ *F16D 21/04* (2013.01); *F16H 3/006* (2013.01); *F16H 3/089* (2013.01); *F16H 3/28* (2013.01); *F16D 23/04* (2013.01); *F16H 37/0813* (2013.01); *F16H 37/0826* (2013.01); *F16H 2003/0822* (2013.01); *F16H 2200/006* (2013.01)

(58) Field of Classification Search
CPC .......... F16D 21/04; F16H 3/006; F16H 3/089; F16H 3/28
USPC .................................................. 74/325, 330
See application file for complete search history.

(56) References Cited

U.S. PATENT DOCUMENTS

| | | | | |
|---|---|---|---|---|
| 6,604,438 | B2* | 8/2003 | Ruhle ................... | B60W 10/02 74/335 |
| 8,720,290 | B2* | 5/2014 | Baldwin ................ | F16H 3/006 74/330 |
| 8,876,651 | B2* | 11/2014 | Mellet ..................... | F16H 3/66 475/277 |
| 9,114,699 | B2* | 8/2015 | Takei ..................... | B60K 6/365 |
| 9,476,461 | B2* | 10/2016 | Genise ................... | B60K 6/48 |

FOREIGN PATENT DOCUMENTS

DE             10165096 B3    8/2015

\* cited by examiner

*Primary Examiner* — Ha Dinh Ho

(74) *Attorney, Agent, or Firm* — Cozen O'Connor

(57) ABSTRACT

A gear unit for a motor vehicle with a main input shaft and an auxiliary input shaft which is connected thereto via a constant gearwheel set step, wherein the constant gearwheel set step can further be connected to the output via a reverse gearwheel set step. At least one synchronized shifting clutch for connecting at least one idler gearwheel of the reverse gearwheel set step to the shaft carrying the idler gearwheel such that the idler gearwheel is fixed with respect to rotation relative to the shaft. The invention is further directed to a motor vehicle including such gear unit.

11 Claims, 2 Drawing Sheets

TRANSMISSION AND VEHICLE

1. FIELD OF THE INVENTION

The present invention is directed to a gear unit for a motor vehicle with a main input shaft and an auxiliary input shaft connected thereto via a constant gearwheel set step, and the constant gearwheel set step can further be connected to the output via a reverse gearwheel set step.

2. BACKGROUND OF THE INVENTION

As a result of this arrangement, a gear unit with two input shafts is provided resulting in a dual-clutch gear unit. In contrast to conventional dual-clutch gear units, the input shafts are arranged in parallel and not coaxially.

In this type of dual-clutch gear unit, the reverse gear is realized in that a hollow shaft with a fixed gearwheel is arranged on a separate reverse-gear shaft and the two shafts are connected to a clutch so as to be fixed with respect to rotation relative to one another.

In addition to the actual reverse-gear shaft, a further shaft is required in this configuration.

In view of the foregoing, it is an object of the present invention to provide a gear unit in which construction is facilitated over the prior art.

SUMMARY OF THE INVENTION

In a gear unit of the type mentioned above, this problem is solved in that at least one synchronized shifting clutch is provided for connecting at least one idler gearwheel of the reverse gearwheel set step to the shaft carrying the idler gearwheel such that the idler gearwheel is fixed with respect to rotation relative to the shaft.

Accordingly, it is suggested to use an individual shaft instead of two coaxially arranged shafts and to use an idler gearwheel instead of the fixed gearwheel, and this idler gearwheel can then be shifted via a synchronized shifting clutch. Synchronized shifting clutches are clutches that are used in gear reduction type gear units, i.e., in gear units with idler gearwheels. In contrast to starting clutches such as disk clutches or friction clutches with pressure plates, a positive engagement connection is produced in these clutches after synchronization of the gear speeds at a clutch. Consequently, the reverse gear is realized in that all of the coupling devices have ultimately been exchanged.

The constant gearwheel set step can preferably have three toothed wheels, the first toothed wheel and the third toothed wheel being arranged at the input shafts and the second toothed wheel situated between the first toothed wheel and the third toothed wheel being arranged on a reverse-gear shaft. Accordingly, the input shafts always have the same rotational direction and the reverse-gear shaft always has a rotational direction opposite thereto without requiring additional gear steps for reversing the rotational direction.

An idler gearwheel meshing with a fixed gearwheel on an output shaft can advantageously be arranged on the reverse-gear shaft. Accordingly, the reverse-gear shaft can be connected directly to the output shaft.

The fixed gearwheel which meshes with an idler gearwheel mounted on the reverse-gear shaft can preferably mesh with at least one idler gearwheel mounted on the input shaft; that is, the fixed gearwheel on the output shaft transmits torque not only with the reverse gear step but also in at least one forward gear. In a particularly preferred manner, the fixed gearwheel meshes with two idler gearwheels mounted on an input shaft, i.e., it can be used to transmit torque in three speeds: reverse gear and two forward gears. This results in a compact construction in axial direction.

The main input shaft and the auxiliary input shaft can advantageously be connected to secondary input shafts via clutches, and the secondary input shafts are arranged coaxial to the main input shaft and the auxiliary input shaft in each instance and carry the toothed wheels of the gearwheel steps. In this arrangement the clutches are arranged on the side of the gear unit remote of the engine.

The gear unit can advantageously have an output shaft on which are arranged only fixed gearwheels. Consequently, the shifting clutches for shifting the forward gears are arranged at the input shafts. These are preferably the secondary input shafts. A compact construction of the gear unit in cross section can be achieved by this configuration.

The gear unit can advantageously have a torque converter which connects the main input shaft to the drivetrain. A comfortable starting such as can otherwise be achieved only in automatic transmissions can be accomplished in this way.

The synchronized shifting clutch can advantageously have a sliding sleeve. Further, it can also comprise a synchronizer connected to the reverse-gear shaft and a synchronizing ring at the idler gearwheel.

The present invention is further directed to a motor vehicle with a gear unit. The motor vehicle is characterized in that the gear unit is constructed in the manner described above.

BRIEF DESCRIPTION OF THE DRAWINGS

Further advantages, features and details of the present invention follow from the embodiment examples and figures described in the following, in which.

DETAILED DESCRIPTION OF THE PRESENTLY PREFERRED EMBODIMENTS

Figure 1:
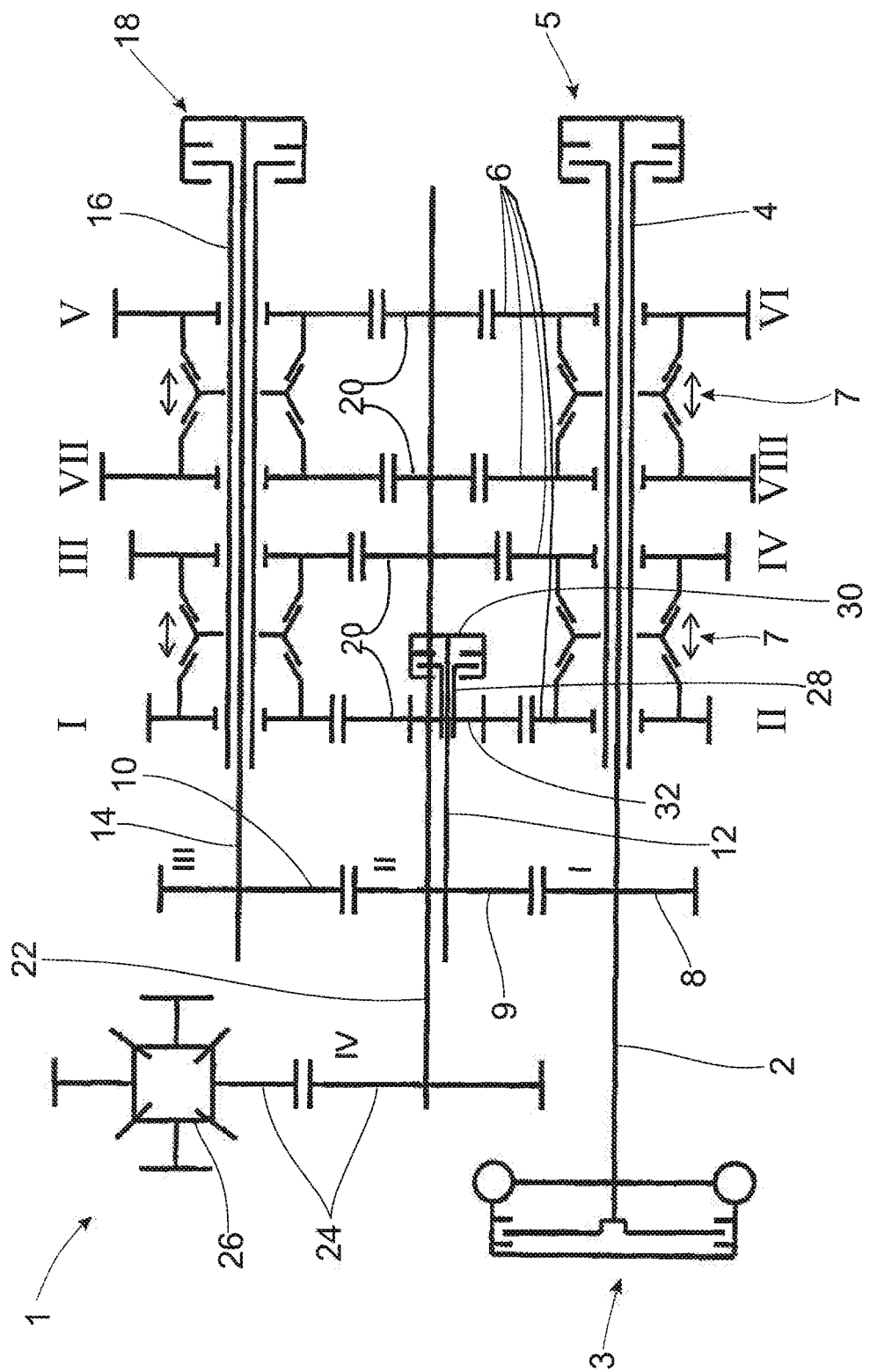
FIG. 1 is a gearwheel set diagram of a prior art gear unit.

FIG. 1 shows a known gear unit 1. In this gear unit 1, a main input shaft 2 can be connected to an engine, not shown, via a converter 3. A secondary input shaft 4 is mounted on the main input shaft 2 and can be connected to the main input shaft 2 via the clutch 5. The clutch 5 can be a single-disk friction clutch or a disk clutch.

The secondary input shaft 4 is constructed as a hollow shaft and is arranged coaxial to the main input shaft 2. Four idler gearwheels 6 are arranged on the secondary input shaft 4 to form gear steps II, IV, VIII and VI. They can be shifted via synchronized shifting clutches formed in this instance by double shifting elements 7. A toothed wheel 8 which is constructed as a fixed gearwheel and together with toothed wheels 9 and 10 forms a constant gearwheel set plane is located at the main input shaft 2 itself. The toothed wheel 9 is arranged at the reverse-gear shaft 12 and toothed wheel 10 is arranged at the auxiliary input shaft 14. The construction is analogous to main input shaft 2 except that the auxiliary input shaft 14 is connected to the drivetrain via the constant gear step and not directly via the converter. The idler gearwheels 6 for generating forward gear steps I, III, VII and V are arranged at the auxiliary input shaft 14. In this case again, the idler gearwheels 6 are located at a secondary input shaft 16 which can be connected to the auxiliary input shaft 14 via a clutch 18. The idler gearwheels 6 engage in each instance with fixed gearwheels 20 which are mounted on an output shaft 22. The output shaft 22 is connected to the differential 26 via toothed wheels 24. A secondary shaft 28 which can be connected to the reverse-gear shaft 12 via a clutch 30 is mounted at the reverse-gear shaft 12. A fixed gearwheel 32 which engages with fixed gearwheel 20 of output shaft 22, with which the idler gearwheels of the first gear step and second gear step likewise engage, is provided at the secondary shaft 28. The reverse gear is engaged by closing the clutch 30.

Figure 2:
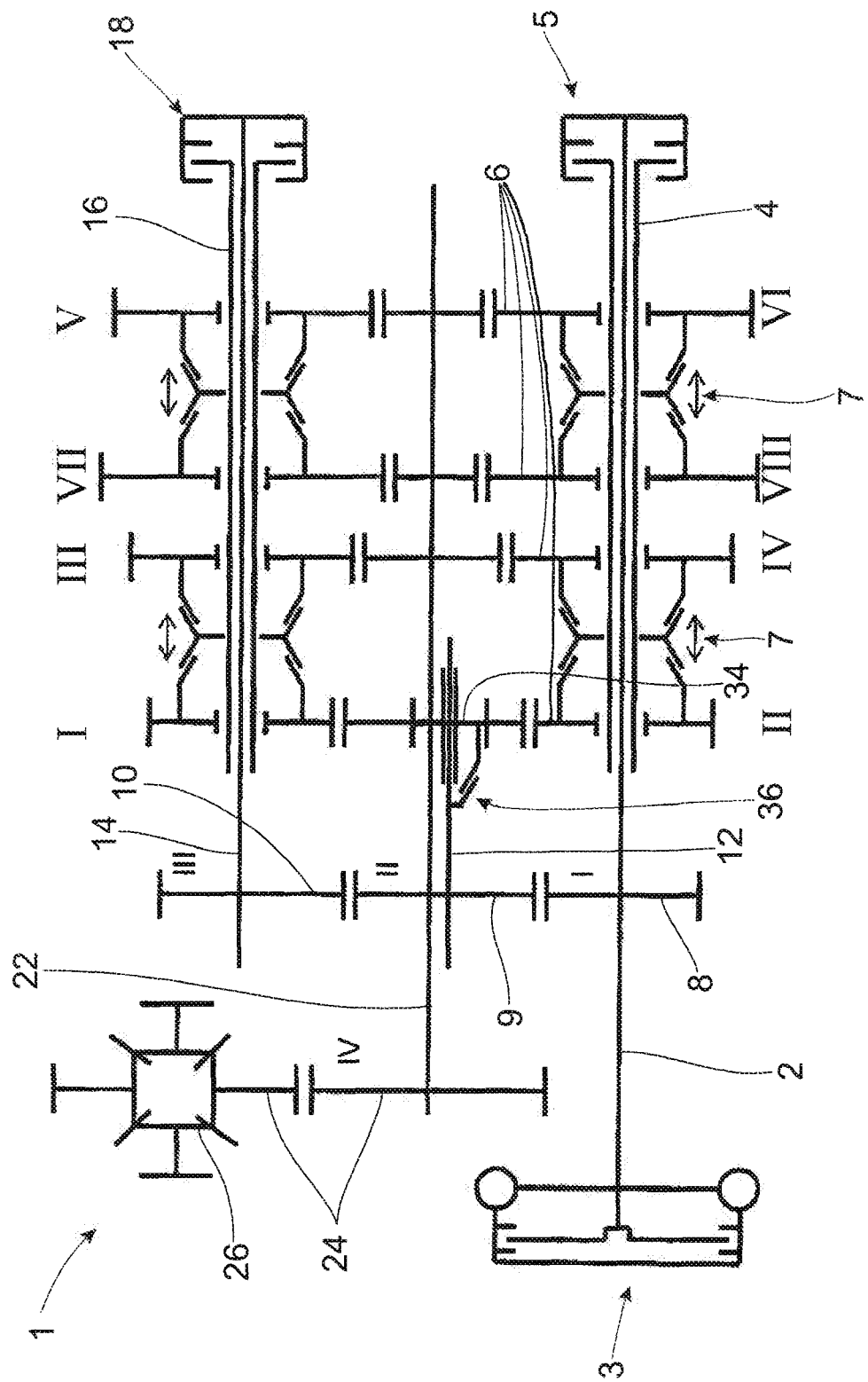
FIG. 2 is a gearwheel set diagram of a gear unit of the present invention.

In contrast, FIG. 2 shows a gear unit 1 in which an idler gearwheel 34 and a synchronized shifting clutch 36 are used in place of a construction with secondary shaft 28 and clutch 30. This reduces the costs for providing the reverse gear.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A gear unit for a motor vehicle comprising:
   a main input shaft;
   an auxiliary input shaft;
   a constant gearwheel set up constructed to connect said main input shaft to said auxiliary input shaft;
   a reverse gearwheel set step comprising a reverse gear shaft and at least one idler gearwheel carried on said reverse gear shaft;
   said constant gearwheel set step constructed to be connectable to an output shaft via said reverse gearwheel set step; and
   at least one synchronized shifting clutch constructed for non-rotatably connecting said idler gearwheel of said reverse gearwheel set step to said reverse gear shaft carrying said at least one idler gear wheel.

2. The gear unit according to claim 1, wherein said constant gearwheel set step comprises three toothed wheels, wherein a first toothed wheel and a third toothed wheel are arranged at said main and auxiliary input shafts and a second toothed wheel is situated between said first toothed wheel and said third toothed wheel arranged on said reverse gear shaft.

3. The gear unit according to claim 1, additionally comprising a fixed gearwheel on said output shaft; and wherein said idler gearwheel meshing with said fixed gearwheel.

4. The gear unit according to claim 3, additionally comprising at least one idler gearwheel mounted on an input shaft, and wherein said fixed gearwheel meshes with said at least one idler gearwheel.

5. The gear unit according to claim 1, additionally comprising:
   secondary input shafts and a plurality of toothed idler gearwheels forming a plurality of gearwheel steps;
   clutches for connecting said main input shaft and said auxiliary input shaft to said respective secondary input shafts; wherein said secondary input shafts are arranged coaxial to said main input shaft and said auxiliary input shaft and carry said toothed idler gearwheels of said gearwheel steps.

6. The gear unit according to claim 1, wherein said output shaft comprises only fixed gearwheels arranged on said output shaft.

7. The gear unit according to claim 1, additionally comprising a plurality of shifting clutches arranged at an input shaft for shifting a forward gear.

8. The gear unit according to claim 1, additionally comprising a torque converter connecting said main input shaft to a drivetrain.

9. The gear unit according to claim 1, wherein said synchronized shifting clutch comprises a sliding sleeve.

10. A motor vehicle comprising a gear unit constructed according to claim 1.

11. The gear unit according to claim 2, additionally comprising a fixed gearwheel on said output shaft; and wherein said idler gearwheel meshing with said fixed gearwheel.

* * * * *